(12) United States Patent
Xiao et al.

(10) Patent No.: US 12,076,911 B2
(45) Date of Patent: Sep. 3, 2024

(54) METAL-PLASTIC COMPOSITE PIPE COMPOUNDING DEVICE AND COMPOUNDING PROCESS

(71) Applicant: HUNAN ZHENHUI PIPE INDUSTRY CO., LTD, Xiangtan (CN)

(72) Inventors: Hefei Xiao, Xiangtan (CN); Xiwei Yin, Xiangtan (CN); Xinai Zhang, Xiangtan (CN); Anming Luo, Xiangtan (CN)

(73) Assignee: HUNAN ZHENHUI PIPE INDUSTRY CO., LTD, Xiangtan (CN)

( * ) Notice: Subject to any disclaimer, the term of this patent is extended or adjusted under 35 U.S.C. 154(b) by 226 days.

(21) Appl. No.: 17/915,469

(22) PCT Filed: Nov. 23, 2021

(86) PCT No.: PCT/CN2021/132230
§ 371 (c)(1),
(2) Date: Sep. 28, 2022

(87) PCT Pub. No.: WO2022/121676
PCT Pub. Date: Jun. 16, 2022

(65) Prior Publication Data
US 2023/0147431 A1    May 11, 2023

(30) Foreign Application Priority Data
Dec. 11, 2020   (CN) .......................... 202011444948.8

(51) Int. Cl.
*B29C 63/34*   (2006.01)
*B29C 63/00*   (2006.01)
(Continued)

(52) U.S. Cl.
CPC .......... *B29C 63/34* (2013.01); *B29C 63/0004* (2013.01); *B29C 63/0069* (2013.01); *B29L 2009/003* (2013.01); *B29L 2023/22* (2013.01)

(58) Field of Classification Search
CPC .............................. B29C 63/34; B29C 63/004
See application file for complete search history.

(56) References Cited

FOREIGN PATENT DOCUMENTS

| CN | 1754683 A | * | 4/2006 |
| CN | 103950185 A | * | 7/2014 |

(Continued)

*Primary Examiner* — Jeffry H Aftergut
(74) *Attorney, Agent, or Firm* — Steven L. Nichols (57) ABSTRACT

The present disclosure provides a metal-plastic composite pipe compounding device and a compounding process, the compounding device comprising a material conveying apparatus, a workbench, and a support apparatus, a clamping assembly and a heating and cooling apparatus which are mounted on the workbench. The clamping assembly may move on the workbench; the material conveying apparatus moves a pipe to be machined into or out of the support apparatus; the support apparatus supports the pipe to be machined and may drive same to ascend or descend; the clamping assembly clamps and seals two ends of a plastic pipe of the pipe to be machined; and the clamping assembly drives the pipe to be machined to pass through the heating and cooling apparatus. In the present disclosure, a feeding process, a clamping process, heating and cooling processes and a discharging process may be completed in sequence by means of the compounding device.

14 Claims, 5 Drawing Sheets

(51) Int. Cl.
*B29L 9/00* (2006.01)
*B29L 23/00* (2006.01)

(56) References Cited

FOREIGN PATENT DOCUMENTS

| | | | |
|---|---|---|---|
| CN | 104309111 A | * | 1/2015 |
| CN | 204136426 U | * | 2/2015 |

* cited by examiner

METAL-PLASTIC COMPOSITE PIPE COMPOUNDING DEVICE AND COMPOUNDING PROCESS

CROSS REFERENCE TO RELATED APPLICATION

This patent application claims the benefit and priority of PCT/CN2021/132230, filed Nov. 23, 2021, which claims the benefit and priority of Chinese Patent Application No. 202011444948.8, filed on Dec. 11, 2020, and claims the benefit and priority of the disclosure of which is incorporated by reference herein in its entirety as part of the present application.

TECHNICAL FIELD

The present disclosure relates to the technical field of pipeline compounding process, and specifically relates to a metal-plastic composite pipe compounding device and a compounding process.

BACKGROUND ART

The metal-plastic composite pipe is a pipe which is formed by compounding an outer layer of a metal pipe and an inner layer of a plastic pipe through a certain process, and has the advantages of a metal pipe and a non-metal pipe. When the metal pipe and the plastic pipe are bonded in a composite mode, the plastic pipe needs to be heated and melted so that the plastic pipe and the inner wall of the metal pipe can be bonded, then cooling is carried out, and the bonded part is cooled and solidified. However, the metal-plastic composite pipe with a large pipe diameter is inconvenient to flow into and flow out of a composite assembly line. Due to large size, the compounding difficulty is increased, and the compounding efficiency is reduced.

SUMMARY

Aiming at the problems in the prior art, the present disclosure aims to provide a metal-plastic composite pipe compounding device and a compounding process. A feeding process, a clamping process, heating and cooling processes and a discharging process may be completed in sequence by means of the compounding device. The device has a compact structure, occupies a small area, is suitable for batch composite production lines, can be suitable for compounding pipes to be machined having relatively large diameters, has high compounding and machining efficiency, and has a high compounding performance. Feeding and discharging may be completed automatically in the feeding process, the sealing of a plastic pipe and the pressurization inside the plastic pipe may be completed in the clamping process, and meanwhile, clamping structures may drive a metal-plastic composite pipe to pass through a heating and cooling apparatus for overall compounding.

To achieve the purpose, the present disclosure adopts the following technical scheme.

A metal-plastic composite pipe compounding device comprises a material conveying apparatus, a workbench, and a support apparatus, a clamping assembly and a heating and cooling apparatus which are mounted on the workbench. The clamping assembly may move on the workbench, the material conveying apparatus moves a pipe to be machined into or out of the support apparatus, the support apparatus supports the pipe to be machined and may drive same to ascend or descend, the clamping assembly clamps and seals two ends of a plastic pipe of the pipe to be machined, and the clamping assembly drives the pipe to be machined to pass through the heating and cooling apparatus.

Further improvement of the technical scheme is as follows.

The material conveying apparatus comprises a material conveying driving motor, two sets of feeding racks arranged in parallel, and a transmission shaft for connecting the two sets of feeding racks, the material conveying driving motor is connected with and drives the transmission shaft to rotate, and the transmission shaft drives the two sets of feeing racks to operate.

The feeding rack comprises a base, a chain wheel assembly and a connecting plate which are mounted on the base, and a pipe supporting assembly for bearing the weight of the pipe to be machined, the chain wheel assembly is rotatably mounted on the base, the pipe supporting assembly is slidably mounted on the base, the two ends of the connecting plate are respectively connected with the chain wheel assembly and the pipe supporting assembly, the transmission shaft is connected with and drives the chain wheel assembly for transmission, and the chain wheel assembly drives the pipe supporting assembly to slide through the connecting plate.

The chain wheel assembly comprises a chain and two transmission wheels, the two transmission wheels are rotatably mounted on the base at an interval, the chain is in sleeve joint to the exteriors of the two transmission wheels, the transmission shaft is connected with and drives one transmission wheels to rotate, and the transmission wheel drives the chain connected with the transmission wheel for transmission.

The pipe supporting assembly comprises a pipe supporting support and at least one sliding block mounted at the bottom of the pipe supporting support, one end of the connecting plate is connected with the top of the chain, and the other end of the connecting plate is connected with the sliding block or the pipe supporting support.

A guide rail is arranged on the base, the sliding block is matched with the guide rail and slide along the guide rail, and the guide rail and the chain are arranged in parallel.

The pipe supporting support comprises a pipe supporting part for bearing the weight of the pipe to be machined and a sliding block connecting part for connecting the sliding block, a plurality of pipe conveying wheels are arranged at the bottom of the pipe supporting part at intervals, the pipe conveying wheels roll along the base, the sliding block connecting part is connected with the pipe supporting part, and the sliding block is arranged at the bottom of the sliding block connecting part.

Two first proximity switches are further arranged on the feeding rack at an interval, when the pipe supporting assembly is located at a set initial position, one first proximity switch can sense the pipe supporting assembly, and when the pipe supporting assembly is located at a set final position of operation, the other first proximity switch can sense the pipe supporting assembly.

The support apparatus comprises a plurality of roller sets arranged at intervals and a plurality of support plates arranged at intervals, the roller set comprises a roller for supporting the pipe to be machined and air cylinders connected with the roller, and the air cylinders are connected with and drive the roller to ascend or descend.

The support apparatus further comprises a plurality of second proximity switches, and one second proximity switch is respectively arranged on the two sides of each of the roller sets.

The support plate is flush with the bottom of the pipe supporting assembly, the feeding rack is connected with the support plate, and the pipe supporting assembly operates from the base to the support plate or reversely operates from the support plate to the base.

The clamping assembly comprises two clamping structures arranged at an interval and a fastening steel rope for connecting the two clamping structures, the clamping structure comprises a clamping base, and a chuck support, a chuck lifting adjusting apparatus, a chuck and a hydraulic apparatus which are mounted on the clamping base, the hydraulic apparatus is mounted on the chuck support, the hydraulic apparatus is connected with and drives the chuck to move in the horizontal direction, the chuck lifting adjusting apparatus is connected with and drives the hydraulic apparatus and the chuck to move in the direction vertical to the horizontal direction, the clamping base is slidably mounted on the workbench, and the two chucks of the two clamping structures are arranged face to face.

The two chucks can respectively clamp and seal the two ends of the plastic pipe of the pipe to be machined. The chuck is provided with a flexible cup ring. The cup ring is in contact with and compresses the inner wall of the plastic pipe of the pipe to be machined after being pressed. The chuck is provided with a cup ring inflating air pipe for providing air pressure for the cup ring. One of the chucks is further provided with a pipeline inflating air pipe for providing air pressure for the interior of the plastic pipe of the pipe to be machined.

The workbench comprises two spaced rails in parallel, and the clamping base is arranged on the rails in a spanning mode to move along the two rails.

The hydraulic apparatus is connected with and drives the chuck to move in the direction parallel to the rail. The chuck support can slide in the direction vertical to the rail and is fixed at any position. The sliding direction of the chuck support is vertical to the moving direction, driving the hydraulic apparatus, of the chuck lifting adjusting apparatus.

The support plate is located between the two rails and is flush with the top surfaces of the rails.

Two sets of material conveying apparatuses are arranged, and the two sets of material conveying apparatuses are arranged at an interval and are respectively used for feeding and discharging.

The roller set is located between the two rails. The roller sets are arranged at intervals along the length direction of the rail. The air cylinder is connected with and drives the roller to move to the height higher than the support plate or the height lower than the support plate.

The heating and cooling apparatus is located between the two clamping structures, the heating and cooling apparatus comprises a heating and cooling rack, and an induction heating ring and a water spraying ring which are mounted on the heating and cooling rack, the induction heating ring and the water spraying ring are arranged at an interval, the inner diameter of the induction heating ring and the inner diameter of the water spraying ring are both larger than the outer diameter of the pipe to be machined, and the clamping assembly drives the pipe to be machined to pass through the induction heating ring and the water spraying ring.

The induction heating ring and the water spraying ring can slide in the direction vertical to the horizontal direction and are fixed at any position, and can slide in the horizontal direction vertical to the rail and are fixed at any position.

A plurality of water spraying holes are formed in the water spraying ring, and the water spraying directions of the water spraying holes face the center line of the water spraying ring.

The heating and cooling apparatus further comprises a medium frequency device connected with the induction heating ring.

The compounding device further comprises a controller, and the first proximity switch, the second proximity switch, the air cylinder and the material conveying driving motor are all electrically connected with the controller.

A metal-plastic composite pipe compounding process, based on the compounding device, comprises a feeding process, a clamping process, heating and cooling processes and a discharging process which are carried out in sequence, wherein in the feeding process, the material conveying apparatus is started, the material conveying apparatus drives the pipe to be machined born on the material conveying apparatus to move onto the support plates of the support apparatus, then, the air cylinders of the roller sets respectively drive the rollers to ascend or rise the pipe to be machined so that the pipe to be machined is separated from the material conveying apparatus, the material conveying apparatus is restarted, and the material conveying apparatus moves out of the support plates and returns to the initial position;

in the clamping process, the hydraulic apparatus is started, and the two sets of hydraulic apparatuses of the two clamping structures respectively drive the two chucks to move face to face and clamp the two ends of the pipe to be machined;

in the heating and cooling processes, an air supply apparatus supplies air for the chuck so that the chucks seal the two ends of the plastic pipe of the pipe to be machined, air is supplied for the interior of the plastic pipe of the pipe to be machined so that the plastic pipe is expanded, and the two clamping structures drive the pipe to be machined to move and pass through the induction heating ring and the water spraying ring in sequence; and in the discharging process, the air pressure of the chuck and the pressure inside the pipe to be machined are released, the hydraulic apparatus is started, the two clamping structures arc separated from the pipe to be machined, the material conveying apparatus is started, the material conveying apparatus is moved into the support plates below the pipe to be machined, the air cylinders are started, the air cylinders drive the rollers to descend to the pipe to be machined so as to be supported on the material conveying apparatus, and the material conveying apparatus is started to drive the pipe to be machined to be moved out of the support plates.

In the feeding process, before the material conveying apparatus is started, the two ends of the pipe to be machined are respectively supported on the two pipe supporting parts of the two feeding racks, and the pipe to be machined is parallel to the length direction of the rail.

In the feeding process, the material conveying driving motor is started, the material conveying driving motor drives the pipe supporting support to move, when the pipe supporting part is moved into the support plates, one first proximity switch senses the sliding block at the back of the pipe supporting part, the first proximity switch transmits sensed information to the controller, and after the controller receives the information of the first proximity switch, the controller controls the material conveying driving motor to stop, and the pipe supporting part is stopped on the support plates.

When the pipe supporting part is arranged on the support plates, the material conveying driving motor is reversely started, the material conveying driving motor drives the pipe supporting support to move, the pipe supporting support is moved out of the support plates and into the base, when the other first proximity switches senses the sliding block, the first proximity switch transmits the sensed information to the controller, and after the controller receives the information of the first proximity switch, the controller controls the material conveying driving motor to stop, and the pipe supporting part is stopped at the set initial position.

After the feeding process is completed, the pipe to be machined is arranged between one chuck and the induction heating ring.

In the clamping process, before the hydraulic apparatus is started, the chuck lifting adjusting apparatus and the chuck support are adjusted, so that the center line of the chuck coincides with the center line of the pipe to be machined.

In the clamping process, before the hydraulic apparatus is started, the heating and cooling rack is adjusted, so that the center line of the induction heating ring, the center line of the water spraying ring and the center line of the pipe to be machined coincide.

In the heating and cooling processes, the pipe to be machined is kept supported on the roller set in the moving process.

In the heating and cooling processes, when the two second proximity switches on the two sides of one roller set can sense the pipe to be machined and then the second proximity switch on one side cannot sense the pipe to be machined, the controller receives information and controls the corresponding air cylinder to drive the roller to descend.

In the heating and cooling processes, when the two second proximity switches on the two sides of one roller set cannot sense the pipe to be machined and then the second proximity switch on one side can sense the pipe to be machined, the controller receives information and controls the corresponding air cylinder to drive the roller to ascend.

In the discharging process, when the topmost part of the material conveying apparatus is higher than the bottommost part of the pipe to be machined, the air cylinders drive the roller connected with the air cylinders to ascend to the height for lifting the pipe to be machined, so that the bottommost part of the pipe to be machined is higher than the topmost part of the material conveying apparatus.

The present disclosure has the beneficial effects that a feeding process, a clamping process, heating and cooling processes and a discharging process may be completed in sequence by means of the compounding device. The device has a compact structure, occupies a small area, is suitable for batch composite production lines, can be suitable for compounding pipes to be machined having relatively large diameters, has high compounding and machining efficiency, and has a high compounding performance. Feeding and discharging may be completed automatically in the feeding process, the sealing of a plastic pipe and the pressurization inside the plastic pipe may be completed in the clamping process, and meanwhile, clamping structures may drive a metal-plastic composite pipe to pass through a heating and cooling apparatus for overall compounding.

DETAILED DESCRIPTION OF THE EMBODIMENTS

The following describes specific embodiments of the present disclosure with reference to the following attached figures. It shall be understood that, the embodiments described herein are only intended to illustrate and explain but not to limit the present disclosure.

In order to facilitate description, spatially relative terms such as "over," "above," "on an upper surface" and "upper" may be used herein to describe a spatial positional relationship of one device or feature with other devices or features as shown in the figures. It should be understood that the spatially relative terms are intended to include different orientations in use or operation in addition to the orientation of the device described in the figures. For example, if a device in the figures is inverted, devices described as "above" or "over" other devices or structures are positioned "below" or "beneath" the other devices or structures. Thus, the exemplary term "over" may include two orientations of the terms such as "over" and "under". The device may also be located in other different ways (rotating by 90 degrees or at other orientations), and the spatially relative descriptions used herein are explained accordingly.

A metal-plastic composite pipe compounding device, as shown in FIG. 1 to FIG. 5, comprises a material conveying apparatus 1, a workbench 2, and a support apparatus, a clamping assembly and a heating and cooling apparatus, a controller and a drag chain trolley 6 which are mounted on the workbench 2.

Figure 1:
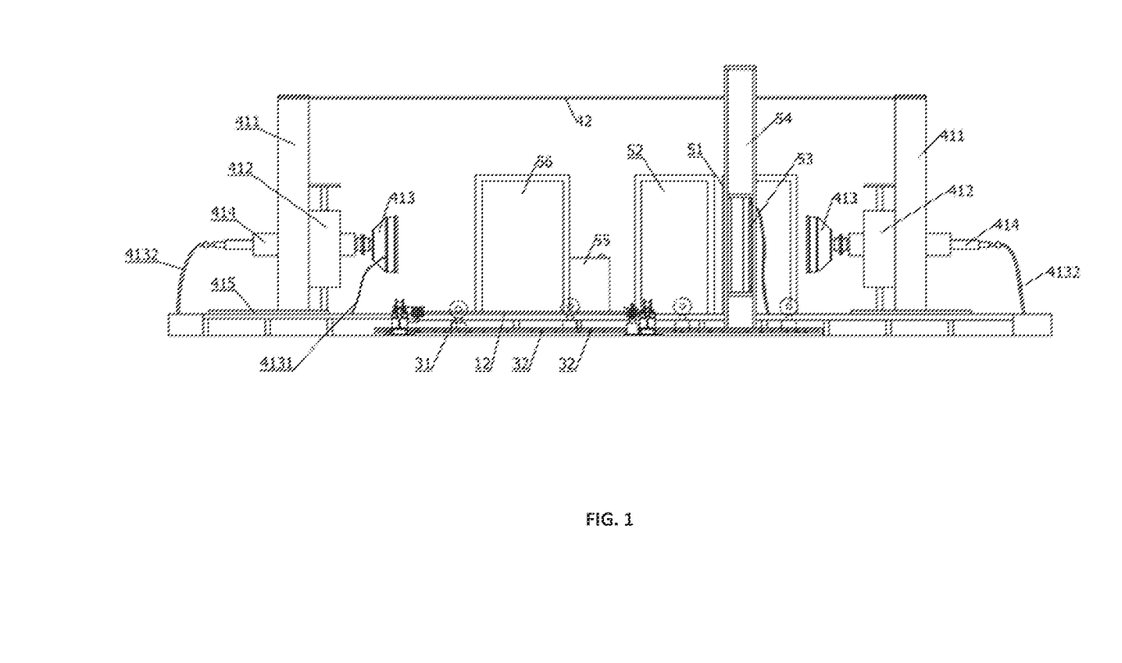
FIG. 1 is a structural schematic diagram of one embodiment in the present disclosure.
Figure 2:
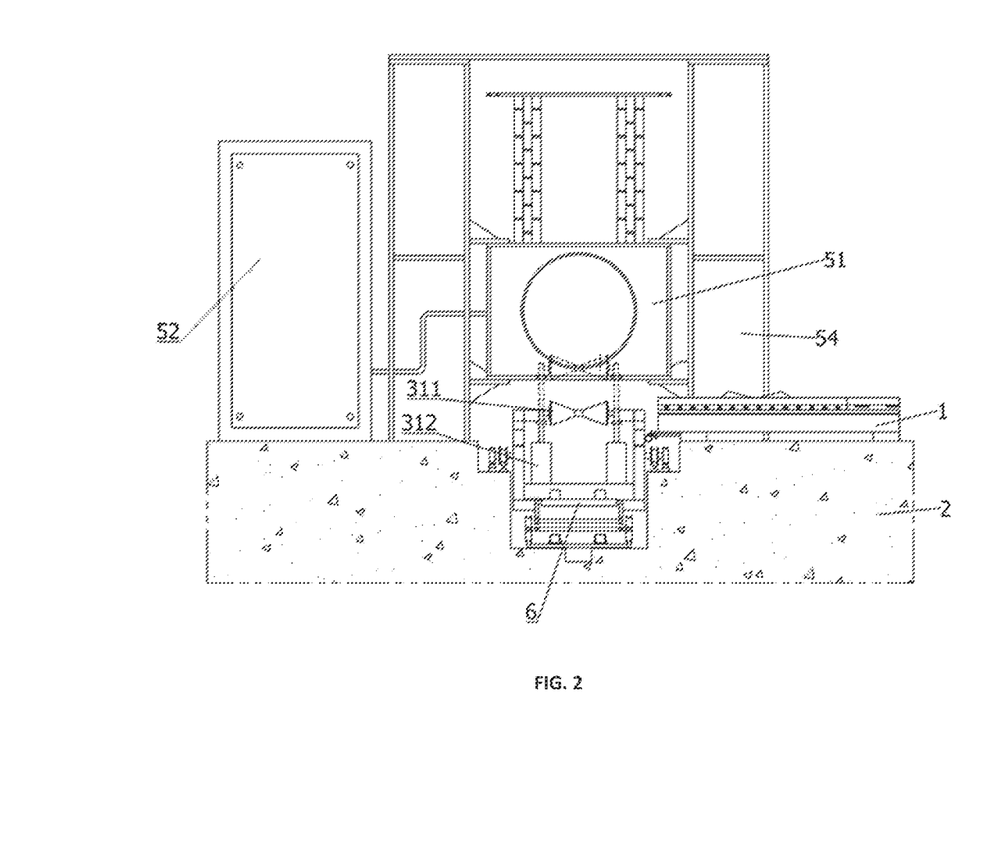
FIG. 2 is a structural schematic diagram of another view of one embodiment in the present disclosure.

The workbench 2 comprises two spaced rails in parallel.

Figure 3:
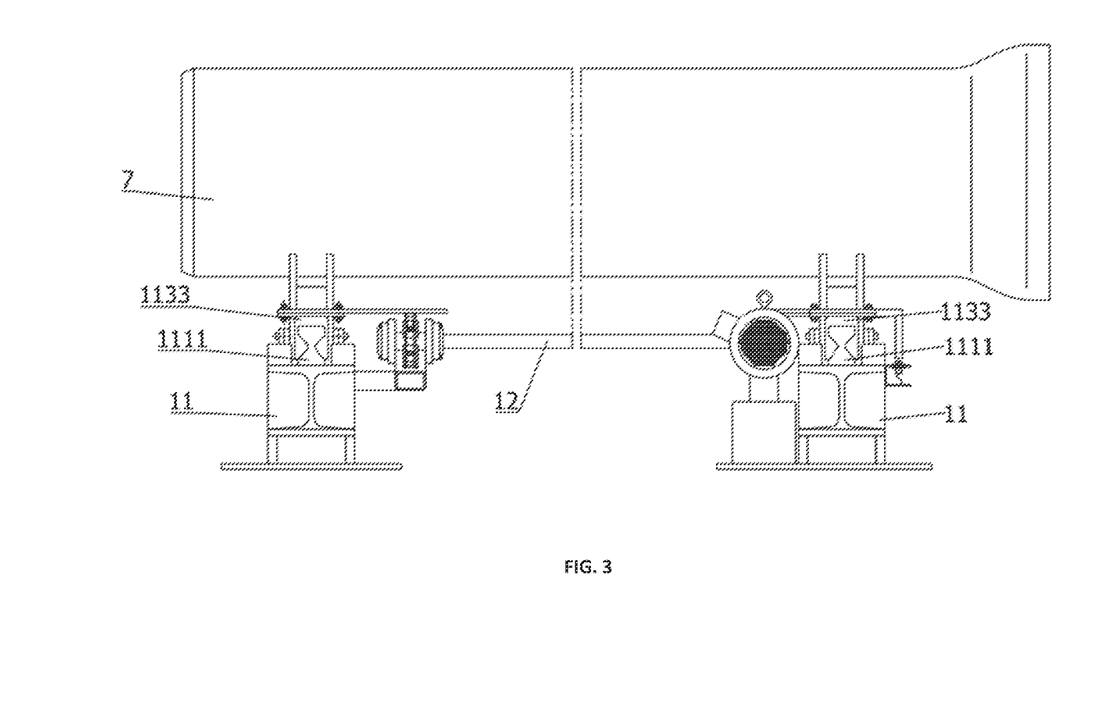
FIG. 3 is a structural schematic diagram of a material conveying apparatus of one embodiment in the present disclosure.

The material conveying apparatus 1 is connected with the workbench 2, and the material conveying apparatus 1 is used for moving the pipe to be machined 7 into or out of the support apparatus on the workbench 2. The material conveying apparatus 1 comprises a material conveying driving motor, two sets of feeding racks 11 arranged in parallel, and a transmission shaft 2 for connecting the two sets of feeding racks 11. The material conveying driving motor drives the transmission shaft 12, and the transmission shaft 12 drives the two sets of feeing racks 11 to operate.

The pipe to be machined 7 comprises a metal pipe and a plastic pipe. The plastic pipe is in sleeve joint into the metal pipe, that is, the plastic pipe is a lining plastic layer of the metal-plastic composite pipe. The two ends of the plastic pipe extend out of the two ends (not shown in the figure) of the metal pipe respectively, so that the clamping assembly can carry out clamping conveniently, and the plastic pipe and the metal pipe are not bonded yet.

Figure 4:
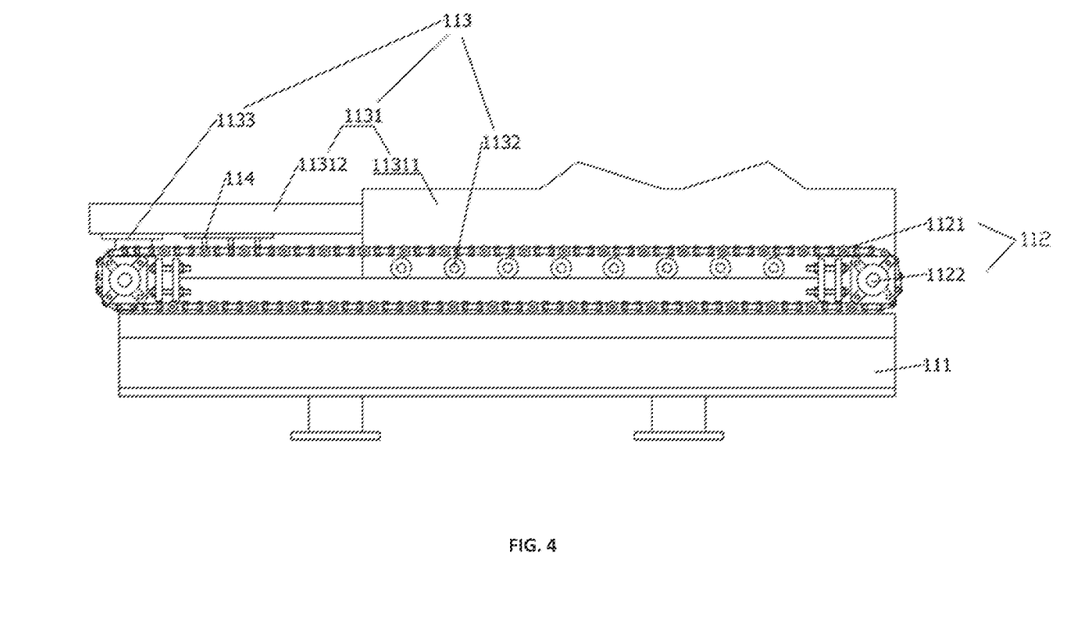
FIG. 4 is a structural schematic diagram of a feeding rack of one embodiment in the present disclosure.
Figure 5:
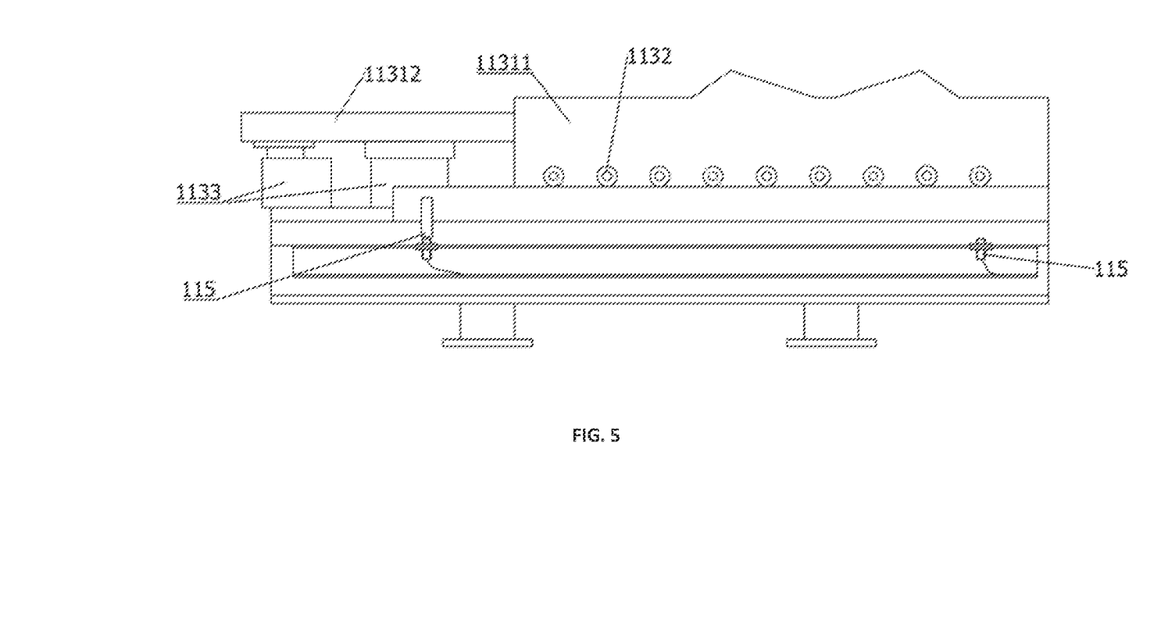
FIG. 5 is a structural schematic diagram of a feeding rack without a chain wheel assembly of one embodiment in the present disclosure.

The feeding rack 11 comprises a base 111, a chain wheel assembly 112, a connecting plate and two first proximity switches 115 which are mounted on the base 111, and a pipe supporting assembly 113 for bearing the weight of the pipe to be machined 7. A guide rail 1111 is arranged on the base 111. The guide rail 1111 protrudes the base 111. The cross section of the guide rail 1111 is in a sandglass-like shape with two big ends and a small middle part.

The chain wheel assembly 112 is rotatably mounted on the base 111. The chain wheel assembly 112 comprises a chain 1121 and two transmission wheels 1122. The two transmission wheels 1122 are rotatably mounted on the base 111 at an interval. The chain 1121 is in sleeve joint to the exteriors of the two transmission wheels 1122. The transmission shaft 12 is connected with and drives one transmission wheels 1122 to rotate. The transmission wheel 1122 drives the chain 1121 connected with the transmission wheel 1122 for transmission. The guide rail 1111 and the chain 1121 are arranged in parallel.

The pipe supporting assembly 113 is slidably mounted on the base 111. The pipe supporting assembly 113 comprises a pipe supporting support 1131 and at least one sliding block 1133 mounted at the bottom of the pipe supporting support 1131. Specifically, the pipe supporting support 1131 comprises a pipe supporting part 11311 for bearing the weight of the pipe to be machined 7 and a sliding block connecting part 11312 for connecting the sliding block 1133. A plurality of pipe conveying wheels 1132 are arranged at the bottom of the pipe supporting part 11311 at intervals. The pipe conveying wheels 1132 are arranged in a row or in multiple rows. The pipe conveying wheels 1132 roll along the base 111. The sliding block connecting part 11312 is connected with the pipe supporting part 11311. The sliding block 1133 is arranged at the bottom of the sliding block connecting part 11312. The sliding block 1133 is matched with the guide rail 1111 and slides along the guide rail 1111. In order to prevent interference, the pipe conveying wheels 1132 are located on one side or two sides of the guide rail 1111. The resistance to slippage of the pipe supporting support 1131 is reduced through the arrangement of the pipe conveying wheels 1132. In the embodiment, two sliding blocks 1133 are arranged.

One end of the connecting plate 114 is connected with the top of the chain 1121, and the other end of the connecting plate 114 is connected with the sliding block 1133 or the pipe supporting support 1131. The transmission shaft 12 is connected with and drives the chain 1121 of the chain wheel assembly 112 for transmission, and the chain 1121 drives the pipe supporting assembly 113 to slide through the connecting plate 114.

The two first proximity switches 115 arc arranged at an interval. The first proximity switches 115 are used for sensing the position of the pipe supporting assembly 113. Two positions, such as the initial point and the final operation point of the pipe supporting assembly 113, are set. When the pipe supporting assembly 113 is located at a set initial position, one first proximity switch 115 can sense the pipe supporting assembly 113, and when the pipe supporting assembly 113 is located at a set final position of operation, the other first proximity switch 115 can sense the pipe supporting assembly 113. Or, when the pipe supporting assembly 113 operates from other positions to the initial point, one first proximity switch 115 senses the positional information of the pipe supporting assembly 113, and when the pipe supporting assembly 113 operates from other positions to the final operation point, the other proximity switch 115 senses the positional information of the pipe supporting assembly 113. The first proximity switch 115 can be flexibly arranged as long as the above-mentioned requirements can be met. In the embodiment, the two first proximity switches 115 are respectively arranged at the two ends of the base 111, and the first proximity switches 115 feed back the positional information by sensing the sliding block 1133.

In the embodiment, two sets of material conveying apparatuses 1 are arranged, and the two sets of material conveying apparatuses 1 are arranged at an interval and are respectively used for feeding and discharging. The two sets of material conveying apparatuses 1 are located on the same side of the rail. The pipe supporting part 11311 is closer to the rail than the sliding block connecting part 11312.

The support apparatus comprises a plurality of roller sets 31 arranged at intervals, a plurality of support plates arranged at intervals and a plurality of second proximity switches 32. The roller sets 31 are located between the two rails of the workbench 2. The roller sets 31 are arranged at intervals along the length direction of the rail. The support plates are located between the two rails and are flush with the top surfaces of the rails. The roller set 31 comprises a roller 311 for supporting the pipe to be machined 7 and air cylinders 312 connected with the roller 311. The air cylinders 312 are connected with and drive the roller 311 to ascend or descend. In FIG. 2, dotted lines indicate the state that the roller 311 is driven to ascend. The roller 311 comprises a roller body and a roller frame. The roller body is rotatably mounted on the roller frame. The air cylinder 312 is connected with and drives the roller frame to ascend or descend. The air cylinder 312 is connected with and drives the roller 311 to move to the height higher than the support plate or the height lower than the support plate. One second proximity switch 32 is respectively arranged on the two sides of each roller set 3.

The support plate and the feeding rack 11 arc connected. Preferably, each support plate is connected with one feeding rack 11. Preferably, in the embodiment, four support plates are arranged and respectively correspond to four feeding racks 11 of the two sets of material conveying apparatuses 1. Specifically, the support plate is flush with the bottom of the pipe supporting assembly 113. When the pipe supporting assembly 113 operates along the guide rail 1111 on the base 111, the pipe supporting part 11311 moves out of the base 111 and simultaneously enters the support plate. When the material conveying driving motor reversely rotates, the pipe supporting part 11311 reversely operates to the base Ill from the support plate.

Based on the structure, when the topmost part of the roller 311 is lower than the support plate, the pipe supporting part 11311 can drive the pipe to be machined 7 to move to the support plate. When the pipe to be machined 7 reaches the support plate, the air cylinder 312 can drive the roller 311 to ascend to make contact with and lift the pipe to be machined 7, so that the pipe to be machined 7 is separated from the pipe supporting part 11311, the pipe supporting part 11311 can be moved out of the support plate conveniently, and feeding is achieved. When discharging is needed, the air cylinder 312 drives the roller 311 to descend until the pipe to be machine 7 makes contact with and is supported by the pipe supporting part 11311, and the roller 311 is separated from the pipe to be machined 7.

The clamping assembly can move on the workbench 2. The clamping assembly is used for clamping and sealing the two ends of the pipe to be machined 7, and rives the pipe to be machined 7 to pass through the heating and cooling apparatus. The clamping assembly comprises two clamping structures arranged at an interval and a fastening steel rope 42 for connecting the two clamping structures. In order to not influence the operation of the device, the fastening steel rope 42 is connected to the tops of the clamping structures.

The clamping structure comprises a clamping base 415, and a chuck support 411, a chuck lifting adjusting apparatus 412, a chuck 413 and a hydraulic apparatus 414 which are mounted on the clamping base 415. The hydraulic apparatus 414 is mounted on the chuck support 411, and the hydraulic apparatus 414 is connected with and drives the chuck 413 to move in the horizontal direction. Specifically, the moving direction of the chuck 413 is parallel to the length direction of the rail. The chuck lifting adjusting apparatus 412 is connected with and drives the hydraulic apparatus 414 and the chuck 413 to move in the direction vertical to the horizontal direction. The chuck lifting adjusting apparatus 412 is a screw nut mechanism or other prior art capable of driving the chuck 413 to move in the direction vertical to the horizontal direction, and is not described in detail herein. The chuck support 411 can slide in the direction vertical to the rail and is fixed at any position, and can be achieved by using schemes in the prior art. For example, the bottom of the chuck support 411 is moved along the rail on the clamping base 415 and is fastened by a nut when moving to any point. The position of the chuck 413 in the three-dimensional space is adjustable in the structure.

The clamping base 415 is slidably mounted on the workbench 2. Specifically, the clamping base 415 is spanned on the two rails and moves along the two rails. The two chucks 413 of the two clamping structures are arranged face to face. The distance between the two chucks 413 can be controlled through the movement of the clamping base 415.

The two chucks 413 can respectively clamp and seal the two ends of the pipe to be machined 7. Specifically, the two chucks 413 clamp and seal the two ends of the plastic pipe, sleeving the interior of a metal pipe, of the pipe to be machined 7. The chuck 413 is provided with a flexible cup ring. The cup ring is in contact with and compresses the inner wall of the plastic pipe after being pressed. The chuck 413 is provided with a cup ring inflating air pipe 4131 for providing air pressure for the cup ring. One of the chucks 413 is further provided with a pipeline inflating air pipe 4132 for providing air pressure for the interior of the plastic pipe.

The detailed structure of the chuck 413 is disclosed in the patents with the application numbers of 2020114357607, 2020114354596 and the like, and the description is not repeated here.

The heating and cooling apparatus comprises a medium frequency device 52, a water tank 55, a cooling tower 56, a heating and cooling rack 54, and an induction heating coil 51 and a water spraying ring 53 which are mounted on the heating and cooling rack 54. The medium frequency device 52 is connected with the induction heating ring 51. The induction heating ring 51 and the water spraying ring 53 are arranged at an interval. The inner diameter of the induction heating ring 51 and the inner diameter of the water spraying ring 53 are larger than the outer diameter of the pipe to be machined 7 and also larger than the outer diameter of the chuck 413. The heating and cooling rack, the induction heating ring 51 and the water spraying ring 53 are located between the two chucks 413. The plane where the induction heating ring 51 is and the plane where the water spraying ring 53 is are both vertical to the rail.

The induction heating ring 51 and the water spraying ring 53 can slide in the direction vertical to the horizontal direction and are fixed at any position, and can slide in the horizontal direction vertical to the rail and are fixed at any position. The positions of the induction heating ring 51 and the water spraying ring 53 are adjusted so that the center lines coincide with the centre line of the pipe to be machined 7.

A plurality of water spraying holes are formed in the water spraying ring 53, and the water spraying directions of the water spraying holes face the center line of the water spraying ring 53. The water spraying ring 53 is connected to the water tank 55.

The first proximity switch 115, the second proximity switch 32, the air cylinder 312 and the material conveying driving motor are all electrically connected with the controller.

The drag chain trolley 6 is used for winding and tidying cables connected with the compounding device. The drag chain trolley 6 is located at the bottom of the workbench 2. When the cables move along with the moving device, the drag chain trolley 6 achieves dynamic tidying of the cables.

A metal-plastic composite pipe compounding process based on the compounding device comprises a feeding process, a clamping process, heating and cooling processes and a discharging process which arc carried out in sequence.

In the feeding process, the material conveying apparatus 1 is started, the material conveying apparatus 1 drives the pipe to be machined 7 born on the material conveying apparatus 1 to move onto the support plates of the support apparatus, then, the air cylinders 312 of the roller sets 31 respectively drive the rollers 311 to ascend or rise the pipe to be machined 7 so that the pipe to be machined 7 is separated from the material conveying apparatus 1, the material conveying apparatus 1 is restarted, and the material conveying apparatus 1 moves out of the support plates and returns to the initial position.

Before the material conveying apparatus 1 is started, the two ends of the pipe to be machined 7 are respectively supported on the two pipe supporting parts 11311 of the two feeding racks 11 of the material conveying apparatus 1, and the pipe to be machined 7 is parallel to the length direction of the rail. The material conveying driving motor is started, the material conveying driving motor drives the pipe supporting support 1131 to move, when the pipe supporting part 11311 is moved into the support plates, the first proximity switch 115 close to the rail senses the sliding block 1133 at the back of the pipe supporting part 11311, the first proximity switch 115 transmits sensed information to the controller, and after the controller receives the information of the first proximity switch 115, the controller controls the material conveying driving motor to stop, and the pipe supporting part 11311 is stopped on the support plates.

After the feeding process is completed, the pipe to be machined 7 is arranged between one chuck 413 and the induction heating ring 51.

In the clamping process, the hydraulic apparatus 414 is started, and the two sets of hydraulic apparatuses 414 of the two clamping structures respectively drive the two chucks 413 to move face to face and clamp the two ends of the plastic pipe of the pipe to be machined 7.

Before the hydraulic apparatus 414 is started, the chuck lifting adjusting apparatus 412 and the chuck support 411 are adjusted, so that the center line of the chuck 413 coincides with the center line of the pipe to be machined 7. And then, the heating and cooling rack 54 is adjusted, so that the center line of the induction heating ring 51, the center line of the water spraying ring 53 and the center line of the pipe to be machined 7 coincide.

In the clamping process, the other chuck 413 can clamp one end of the plastic pipe of the pipe to be machined 7 only after passing through the water spraying ring 53 and the induction heating ring 51 in sequence.

In the heating and cooling processes, an air supply apparatus supplies air for the chuck 413 so that the chucks seal the two ends of the plastic pipe of the pipe to be machined 7, air is supplied for the interior of the plastic pipe of the pipe to be machined 7 so that the plastic pipe is expanded, and the two clamping structures drive the pipe to be machined 7 to move and pass through the induction heating ring 51 and the water spraying ring 53 in sequence.

The plastic pipe is attached to the inner wall of the pipe to be machined 7 after being expanded by the pressurized gas, so that subsequent heating of a melt is facilitated to be bonded to the inner wall, and the compounding effect is guaranteed. The two ends of the plastic pipe are sealed, so that the effectiveness of pressure application can be guaranteed.

In the heating and cooling processes, the pipe to be machined 7 is kept supported on the roller set 31 in the moving process. The pipe to be machined 7 is driven by the chuck 413 to operate.

When the two second proximity switches 32 on the two sides of one roller set 31 can sense the pipe to be machined 7 and the second proximity switch 32 on one side of the roller set 31 cannot sense the pipe to be machined 7 at a certain moment, it is indicated that the pipe to be machined 7 needs to leave the roller set 31 immediately, the roller set 31 does not support the pipe to be machined 7 any longer, and in order to prevent the pipe to be machined 7 from interfering with the operation of the clamping base 415, the controller controls the air cylinder 312 of the roller set 31 to drive the roller 311 to descend.

When the two second proximity switches 32 on the two sides of one roller set 31 cannot sense the pipe to be machined 7 and the second proximity switch 32 on one side of the roller set 31 can sense the pipe to be machined 7 at a certain moment, it is indicated that the pipe to be machined 7 needs to leave the roller set 31 immediately, the roller set 31 needs not support the pipe to be machined 7, and the controller controls the air cylinder 312 of the roller set 31 to drive the roller 311 to ascend.

In the discharging process, the air pressure of the chuck 413 and the pressure inside the pipe to be machined 7 are released, the hydraulic apparatus 44 is started, the two clamping structures are separated from the pipe to be machined 7, the material conveying apparatus 1 is started, the material conveying apparatus 1 is moved into the support plates below the pipe to be machined 7, the air cylinders 312 are started, the air cylinders 312 drive the rollers 311 to descend to the pipe to be machined 7 so as to be supported on the material conveying apparatus 1, and the material conveying apparatus 1 is started to drive the pipe to be machined 7 to be moved out of the support plates.

In the discharging process, when the topmost part of the material conveying apparatus 1 is higher than the bottommost part of the pipe to be machined 7, the air cylinders 312 drive the roller 311 connected with the air cylinders 312 to ascend to the height for lifting the pipe to be machined 7, so that the bottommost part of the pipe to be machined 7 is higher than the topmost part of the material conveying apparatus 1 so that the pipe supporting part 11311 can enter the support plate.

When the pipe to be machined 7 is supported on the pipe supporting part 11311, the material conveying driving motor is reversely started. The material conveying driving motor drives the pipe supporting support 1131 to move. The pipe supporting part 11311 moves out of the support plates and into the base 111. When the first proximity switch 115 away from the rail senses the sliding block 1133, the first proximity switch 115 transmits the sensed information to the controller. The controller controls the material conveying driving motor to stop after receiving the information of the first proximity switch 115. The pipe supporting part 11311 is stopped at the set initial position.

Finally, it is necessary to point out that the following detailed description is only used for further illustration of the present disclosure and is not to be construed as limiting the scope of protection of the present disclosure. Some non-essential improvements and adjustments to the present disclosure may be made by those skilled in the art according to the present disclosure.

What is claimed is:

1. A metal-plastic composite pipe compounding device, comprising a material conveying apparatus, a workbench, and a support apparatus, a clamping assembly and a heating and cooling apparatus which are mounted on the workbench, wherein the clamping assembly may move on the workbench, the material conveying apparatus moves a pipe to be machined into or out of the support apparatus, the support apparatus supports the pipe to be machined and may drive same to ascend or descend, the clamping assembly clamps and seals two ends of the pipe to be machined, and the clamping assembly drives the pipe to be machined to pass through the heating and cooling apparatus.

2. The metal-plastic composite pipe compounding device according to claim 1, wherein the material conveying apparatus comprises a material conveying driving motor, two sets of feeding racks arranged in parallel, and a transmission shaft for connecting the two sets of feeding racks, the material conveying driving motor is connected with and drives the transmission shaft to rotate, and the transmission shaft drives the two sets of feeing racks to operate.

3. The metal-plastic composite pipe compounding device according to claim 2, wherein the feeding rack comprises a base, and a chain wheel assembly and a connecting plate which are mounted on the base, and a pipe supporting assembly for bearing the weight of the pipe to be machined, the chain wheel assembly is rotatably mounted on the base, the pipe supporting assembly is slidably mounted on the base, the two ends of the connecting plate are respectively connected with the chain wheel assembly and the pipe supporting assembly, the transmission shaft is connected with and drives the chain wheel assembly for transmission, and the chain wheel assembly drives the pipe supporting assembly to slide through the connecting plate.

4. The metal-plastic composite pipe compounding device according to claim 3, wherein the chain wheel assembly comprises a chain and two transmission wheels, the two transmission wheels are rotatably mounted on the base at an interval, the chain is in sleeve joint to the exteriors of the two transmission wheels, the transmission shaft is connected with and drives one of the transmission wheels to rotate, and the transmission wheel drives the chain connected with the transmission wheel for transmission; the pipe supporting assembly comprises a pipe supporting support and at least one sliding block mounted at the bottom of the pipe supporting support, one end of the connecting plate is connected with the top of the chain, and the other end of the connecting plate is connected with the sliding block or the pipe supporting support; a guide rail is arranged on the base, the sliding block is matched with the guide rail and slide along the guide rail, and the guide rail and the chain are arranged in parallel; the pipe supporting support comprises a pipe supporting part for bearing the weight of the pipe to be machined and a sliding block connecting part for connecting the sliding block, a plurality of pipe conveying wheels are arranged at the bottom of the pipe supporting part at intervals, the pipe conveying wheels roll along the base, the sliding block connecting part is connected with the pipe supporting part, and the sliding block is arranged at the bottom of the sliding block connecting part.

5. The metal-plastic composite pipe compounding device according to claim 4, wherein two first proximity switches are further arranged on the feeding rack at an interval, when the pipe supporting assembly is located at a set initial position, one of the first proximity switches can sense the pipe supporting assembly, and when the pipe supporting assembly is located at a set final position of operation, the other of the first proximity switches can sense the pipe supporting assembly.

6. The metal-plastic composite pipe compounding device according to claim 5, wherein the support apparatus comprises a plurality of roller sets arranged at intervals and a plurality of support plates arranged at intervals, the roller set comprises a roller for supporting the pipe to be machined and air cylinders connected with the roller, and the air cylinders are connected with and drive the roller to ascend or descend.

7. The metal-plastic composite pipe compounding device according to claim 6, wherein the support apparatus further comprises a plurality of second proximity switches, and one of the second proximity switches is respectively arranged on the two sides of each of the roller sets.

8. The metal-plastic composite pipe compounding device according to claim 7, wherein the clamping assembly comprises two clamping structures arranged at an interval and a fastening steel rope for connecting the two clamping structures, the clamping structure comprises a clamping base, and a chuck support, a chuck lifting adjusting apparatus, a chuck and a hydraulic apparatus which are mounted on the clamping base, the hydraulic apparatus is mounted on the chuck support, the hydraulic apparatus is connected with and drives the chuck to move in the horizontal direction, the chuck lifting adjusting apparatus is connected with and drives the hydraulic apparatus and the chuck to move in the direction vertical to the horizontal direction, the clamping base is slidably mounted on the workbench, and the two chucks of the two clamping structures are arranged face to face; and the workbench comprises two spaced rails in parallel, and the clamping base is arranged on the rails in a spanning mode to move along the two rails.

9. The metal-plastic composite pipe compounding device according to claim 8, wherein the heating and cooling apparatus is located between the two clamping structures, the heating and cooling apparatus comprises a heating and cooling rack, and an induction heating ring and a water spraying ring which are mounted on the heating and cooling rack, the induction heating ring and the water spraying ring are arranged at an interval, the inner diameter of the induction heating ring and the inner diameter of the water spraying ring are both larger than the outer diameter of the pipe to be machined, and the clamping assembly drives the pipe to be machined to pass through the induction heating ring and the water spraying ring.

10. The metal-plastic composite pipe compounding device according to claim 9, further comprising a controller, wherein the first proximity switch, the second proximity switch, the air cylinder and the material conveying driving motor are all electrically connected with the controller.

11. A metal-plastic composite pipe compounding process, based on the metal-plastic composite pipe compounding device according to claim 10, comprising a feeding process, a clamping process, heating and cooling processes and a discharging process which are carried out in sequence, wherein in the feeding process, the material conveying apparatus is started, the material conveying apparatus drives the pipe to be machined born on the material conveying apparatus to move onto the support plates of the support apparatus, then, the air cylinders of the roller sets respectively drive the rollers to ascend or rise the pipe to be machined so that the pipe to be machined is separated from the material conveying apparatus, the material conveying apparatus is restarted, and the material conveying apparatus moves out of the support plates and returns to the initial position;

in the clamping process, the hydraulic apparatus is started, and the two sets of hydraulic apparatuses of the two clamping structures respectively drive the two chucks to move face to face and clamp the two ends of the pipe to be machined;

in the heating and cooling processes, an air supply apparatus supplies air for the chuck so that the chucks seal the two ends of the plastic pipe of the pipe to be machined, air is supplied for the interior of the plastic pipe of the pipe to be machined so that the plastic pipe is expanded, and the two clamping structures drive the pipe to be machined to move and pass through the induction heating ring and the water spraying ring in sequence; and in the discharging process, the air pressure of the chuck and the pressure inside the pipe to be machined are released, the hydraulic apparatus is started, the two clamping structures are separated from the pipe to be machined, the material conveying apparatus is started, the material conveying apparatus is moved into the support plates below the pipe to be machined, the air cylinders are started, the air cylinders drive the rollers to descend to the pipe to be machined so as to be supported on the material conveying apparatus, and the material conveying apparatus is started to drive the pipe to be machined to be moved out of the support plates.

12. The metal-plastic composite pipe compounding process according to claim 11, wherein in the feeding process, before the material conveying apparatus is started, the two ends of the pipe to be machined are respectively supported on the two pipe supporting parts of the two feeding racks, and the pipe to be machined is parallel to the length direction of the rail.

13. The metal-plastic composite pipe compounding process according to claim 12, wherein in the feeding process, the material conveying driving motor is started, the material conveying driving motor drives the pipe supporting support to move, when the pipe supporting part is moved into the support plates, one of the first proximity switches senses the sliding block at the back of the pipe supporting part, the first proximity switch transmits sensed information to the controller, and after the controller receives the information of the first proximity switch, the controller controls the material conveying driving motor to stop, and the pipe supporting part is stopped on the support plates.

14. The metal-plastic composite pipe compounding process according to claim 13, wherein when the pipe supporting part is arranged on the support plates, the material conveying driving motor is reversely started, the material conveying driving motor drives the pipe supporting support to move, the pipe supporting support is moved out of the support plates and into the base, when the other of the first proximity switches senses the sliding block, the first proximity switch transmits the sensed information to the controller, and after the controller receives the information of the first proximity switch, the controller controls the material conveying driving motor to stop, and the pipe supporting part is stopped at the set initial position.

\* \* \* \* \*